(12) United States Patent
Yi

(10) Patent No.: US 7,355,529 B2
(45) Date of Patent: Apr. 8, 2008

(54) BINARY IMAGE COMPRESSION APPARATUS AND METHOD

(75) Inventor: Jong-hyon Yi, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 11/410,910

(22) Filed: Apr. 26, 2006

(65) Prior Publication Data

US 2006/0238390 A1    Oct. 26, 2006

(30) Foreign Application Priority Data

Apr. 26, 2005    (KR) ...................... 10-2005-0034703

(51) Int. Cl.
*H03M 7/00* (2006.01)
(52) U.S. Cl. ..................... 341/50; 341/51; 382/219
(58) Field of Classification Search ............ 341/50, 341/51, 106; 382/170, 219, 135, 124, 199
See application file for complete search history.

(56) References Cited

U.S. PATENT DOCUMENTS 6,091,844 A * 7/2000 Fujii et al. ................. 382/135
7,031,501 B2 * 4/2006 Adachi et al. .............. 382/124
7,085,418 B2 * 8/2006 Kaneko et al. .............. 382/219
7,133,558 B1 * 11/2006 Ohara et al. ................ 382/199
7,194,131 B2 * 3/2007 Dunton et al. .............. 382/170
2005/0052364 A1 * 3/2005 Otawara et al. .............. 345/63

FOREIGN PATENT DOCUMENTS

| JP | 7-231390   | 8/1995 |
| JP | 10-31717   | 2/1998 |
| JP | 2000-151422 | 5/2000 |
| KR | 2000-31178 | 6/2000 |

* cited by examiner

*Primary Examiner*—Peguy JeanPierre
(74) *Attorney, Agent, or Firm*—Stanzione & Kim, LLP

(57) ABSTRACT

A binary image compression apparatus and method. The apparatus to compress a binary image includes a symbol extraction unit to extract symbols from a binary image, a symbol dictionary including a plurality of representative symbols registered therein and to register one or more of the extracted symbols when the one or more extracted symbols do not match the registered representative symbols, a symbol matching unit to perform a matching operation of the extracted symbols with the representative symbols using a plurality of thresholds to determine an index of the extracted symbols, and an encoding unit to compress symbols registered in the symbol dictionary and corresponding indexes, to compress indexes of the symbols extracted from the binary image and position information of each of the extracted symbols, and to generate a final bitstream from the compressed symbols, indexes, and position information.

41 Claims, 7 Drawing Sheets

BINARY IMAGE COMPRESSION APPARATUS AND METHOD

CROSS-REFERENCE TO RELATED APPLICATIONS

This application claims the benefit of Korean Patent Application No. 10-2005-0034703, filed on Apr. 26, 2005, in the Korean Intellectual Property Office, the disclosure of which is incorporated herein in its entirety by reference.

BACKGROUND OF THE INVENTION

1. Field of the Invention

The present general inventive concept relates to image compression, and more particularly, to a binary image compression apparatus and method, by which pattern matching is performed in a binary image using multiple thresholds and a result of the pattern matching is compressed.

2. Description of the Related Art

A binary image, such as a black and white image, includes an image component that can be distinguished by symbols, such as text, and an image component that cannot be distinguished by symbols, such as a picture. According to the JBIG2 standard, which is described in the ITU-T recommendation T.88, the image component that can be distinguished using symbols is compressed by an image encoding method based on symbol matching, and the remaining image components (i.e., that cannot be distinguished as symbols) are compressed using a content-based arithmetic encoding method or halftone encoding method. Data compressed using different encoding methods is transmitted in units of segments. In particular, the image component compressed using the image encoding method based on the symbol matching is expressed by a symbol dictionary segment and a symbol region segment. In the symbol dictionary segment, bitmaps of symbols repeatedly used in a binary image are compressed using a memory medium ring encoding method or the arithmetic encoding method, and information about a width and a height of each symbol is also compressed by Huffman encoding or the arithmetic encoding method. In the symbol region segment, a position of each symbol included in the binary image and an index of each symbol obtained from a symbol dictionary are compressed using the Huffman encoding method or the arithmetic encoding method.

A process of forming the symbol dictionary segment will now be explained.

First, an attempt is made to match a newly extracted symbol of the binary image with representative symbols existing in the symbol dictionary. If there is a matching symbol in the representative symbols of the symbol dictionary, the newly extracted symbol is encoded using the index of the matching symbol. If there is no matching symbol in the representative symbols of symbol dictionary, the newly extracted symbol is added to the symbol dictionary and is encoded using an index (i.e., a new index) that is given at this time. Thus, an attempt is made to match the newly extracted symbol with all the representative symbols existing in the symbol dictionary. At this time, either a method of using a first match or a method of using a best match is used to match the newly extracted symbol to the existing representative symbols in the symbol dictionary. In the method of using the first match, a first representative symbol having a matching score equal to or less than a threshold is determined as the matching result of the matching symbol in the representative symbols in the symbol dictionary. In the method of using the best match, a best matching score is determined as the matching result of the matching symbol after matching the newly extracted symbol with all the representative symbols existing in the symbol dictionary.

When employing the method of using the first match, the time taken for matching can be reduced, however, the accuracy of the matching is lower. When employing the method of using the best match, the accuracy of the matching is better, however, the time taken for the matching may increase.

SUMMARY OF THE INVENTION

The present general inventive concept provides a binary image compression apparatus and method, in which pattern matching operation is performed on a binary image using multiple thresholds and a result of the pattern matching operation is compressed.

Additional aspects of the present general inventive concept will be set forth in part in the description which follows and, in part, will be obvious from the description, or may be learned by practice of the general inventive concept.

The foregoing and/or other aspects of the present general inventive concept may be achieved by providing an apparatus to compress a binary image, the apparatus including a symbol extraction unit to extract symbols from a binary image, a symbol dictionary including a plurality of representative symbols registered therein and to register one or more of the extracted symbols when the one or more extracted symbols do not match the representative symbols, a symbol matching unit to perform a matching operation of the extracted symbols with the representative symbols using a plurality of thresholds to determine an index of the extracted symbols, and an encoding unit to compress symbols registered in the symbol dictionary and corresponding indexes, to compress indexes of the symbols extracted from the binary image and position information of each of the extracted symbols, and to generate a final bitstream from the compressed symbols, indexes, and position information.

The foregoing and/or other aspects of the present general inventive concept may also be achieved by providing an apparatus to compress a binary image, the apparatus including a symbol extraction unit to extract first and second symbols from a binary image, a memory unit to store representative symbols, and a unit to determine one of the representative symbols as a first representative symbol corresponding to the first symbol according to a first threshold and a first comparison result between the first symbol and the representative symbols, to determine another one of the representative symbols as a second representative symbol corresponding to the second symbol according to the first threshold, a second threshold, and a second comparison result between the second symbol and the representative symbols, and to generate a bitstream according to information on the first representative symbol, the first symbol, the second representative symbol, and the second symbol.

The foregoing and/or other aspects of the present general inventive concept may also be achieved by providing an apparatus to compress a binary image, the apparatus including an encoder having a symbol extraction unit to extract first and second symbols from a binary image, a memory unit to store representative symbols, and a unit to determine one of the representative symbols as a first representative symbol corresponding to the first symbol according to a first threshold and a first comparison result between the first symbol and the representative symbols, to determine another one of the representative symbols as a second representative symbol corresponding to the second symbol according to the first threshold, a second threshold, a second comparison result between the second symbol and the representative symbols, and to generate a bitstream according to information on the first representative symbol, the first symbol, the second representative symbol, and the second symbol, and a decoder to receive the bitstream and to decompress the bitstream into binary image data.

The foregoing and/or other aspects of the present general inventive concept may also be achieved by providing a binary compression apparatus, including an extraction unit to extract one or more symbols from a binary image, and a symbol matching unit to select one or more preregistered symbols that match the one or more extracted symbols by comparing the one or more extracted symbols to one or more preregistered symbols to determine one or more similarity scores, comparing the one or more similarity scores to at least one of a definite threshold that indicates a definite match and a potential threshold that indicates a potential match, and selecting the one or more preregistered symbols based on the comparison with the at least one of the definite and potential thresholds.

The foregoing and/or other aspects of the present general inventive concept may also be achieved by providing a symbol matching unit to match one or more symbols extracted from a binary image by comparing one or more similarity scores between the one or more extracted symbols and one or more preregistered representative symbols to at least two similarity score thresholds to determine a matching representative symbol.

The foregoing and/or other aspects of the present general inventive concept may also be achieved by providing a binary compression apparatus including a symbol extraction unit to extract a plurality of symbols from a binary image, a score calculation unit to determine a similarity score between a first extracted symbol and a first representative symbol, and a multithreshold comparison unit to determine whether the similarity score has a high degree of similarity, a low degree of similarity, or a medium degree of similarity according to a comparison with a plurality of similarity thresholds and to determine whether the first representative symbol matches the first extracted symbol based on the comparison of the corresponding similarity score with the plurality of similarity thresholds.

The foregoing and/or other aspects of the present general inventive concept may also be achieved by providing a binary compression apparatus, including a symbol extraction unit to extract symbols from a binary image, and a symbol matching unit to match each extracted symbol with one of a plurality of registered symbols using a high similarity threshold and a low similarity threshold. The symbol matching unit matches a first extracted symbol with a first registered symbol when a degree of similarity therebetween is greater than the high similarity threshold, and determines that the first extracted symbol does not match the first registered symbol when the degree of similarity is less than the low similarity threshold.

The foregoing and/or other aspects of the present general inventive concept may also be achieved by providing a binary compression apparatus, including a symbol extraction unit to extract at least one symbol from a binary image, and a symbol matching unit to sequentially compare the at least one symbol with a plurality of registered symbols until a registered symbol of a first predetermined degree of similarity is selected while maintaining registered symbols having a second predetermined degree of similarity with the at least one extracted symbol such that if none of the registered symbols have the first predetermined degree of similarity with the at least one extracted symbol, one of the maintained registered symbols is selected.

The foregoing and/or other aspects of the present general inventive concept may also be achieved by providing a method of compressing a binary image, the method including extracting symbols from a binary image, comparing each matching score calculated between the extracted symbols and representative symbols registered in a symbol dictionary with a plurality of thresholds to designate an index for the extracted symbols, and compressing symbols registered in the symbol dictionary and corresponding indexes, compressing indexes of the extracted symbols from the binary image and position information of each of the extracted symbols, and generating a final bitstream from the compressed symbols, indexes, and position information.

The foregoing and/or other aspects of the present general inventive concept may also be achieved by providing a method of compressing a binary image, the method including extracting at least one symbol from a binary image, and sequentially comparing the at least one extracted symbol with a plurality of registered symbols until a registered symbol of a first predetermined degree of similarity is selected while maintaining registered symbols having a second predetermined degree of similarity with the at least one symbol such that if none of the registered symbols have the first predetermined degree of similarity one of the maintained registered symbols is selected.

The foregoing and/or other aspects of the present general inventive concept may also be achieved by providing a computer readable recording medium having a computer program embodied thereon to execute the method of compressing a binary image (described above).

BRIEF DESCRIPTION OF THE DRAWINGS

These and/or other aspects of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
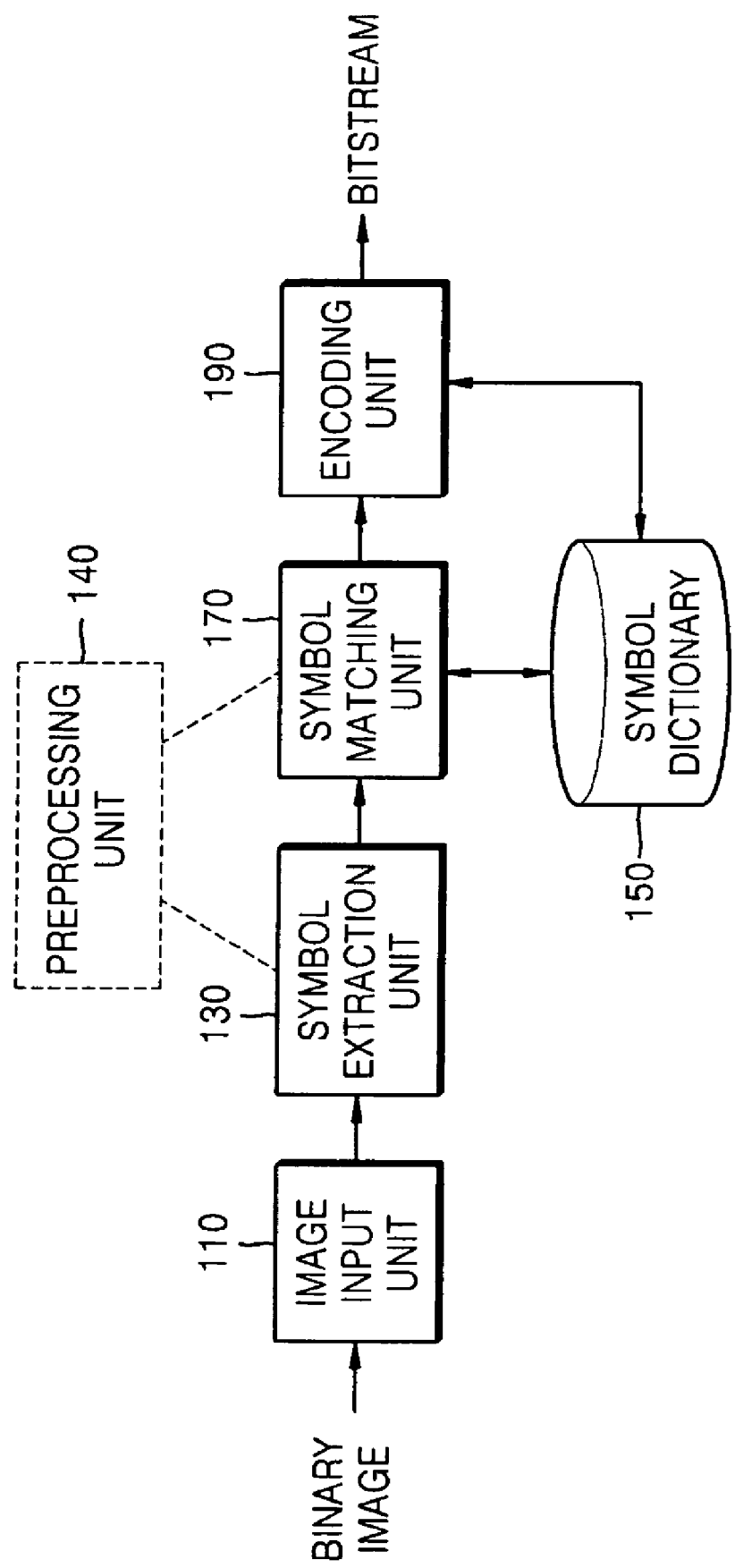
FIG. 1 is a block diagram illustrating a binary image compression apparatus according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 is a block diagram illustrating a binary image compression apparatus according to an embodiment of the present general inventive concept. Referring to FIG. 1, the apparatus includes an image input unit 110, a symbol extraction unit 130, a symbol dictionary 150, a symbol matching unit 170, and an encoding unit 190.

The image input unit 110 receives a binary image from a scanner or an image pickup apparatus.

The symbol extraction unit 130 extracts symbols from the binary image provided by the image input unit 110 and generates bitmaps of the extracted symbols. The symbol extraction unit 130 can extract the symbols based on a variety of pattern recognition algorithms. In the present embodiment, a pattern recognition algorithm using connected components may be used. A preprocessing unit 140 may receive the output (extracted symbols) of the symbol extraction unit 130 to perform a preprocessing process, such as smoothing of edges of the extracted symbols and may output the edge-smoothed symbols as the extracted symbols, such that an accuracy of a symbol matching operation can be improved.

The symbol dictionary 150 stores bitmaps of a plurality of representative symbols registered in advance (i.e., pre-stored) of the symbol matching operation. The symbol dictionary 150 can also register bitmaps of symbols that are extracted in the symbol extraction unit 130 according to a result of the symbol matching operation performed in the symbol matching unit 170. That is, if the result of the symbol matching operation in the symbol matching unit 170 indicates that there is no representative symbol in the symbol dictionary 150 that matches the symbol currently input from the symbol extraction unit 130, the current input symbol is registered in the symbol dictionary 150 as a new representative symbol.

The symbol matching unit 170 attempts to match the symbol extracted in the symbol extraction unit 130 (i.e., the current input symbol) with one of the representative symbols registered in the symbol dictionary 150 by using a first threshold (TH1) and a second threshold (TH2). If the symbol matching unit 170 finds a representative symbol in the symbol dictionary 150 that matches the extracted symbol, an index of the matching representative symbol is provided to the encoding unit 190. If there is no matching representative symbol in the symbol dictionary 150, the extracted symbol is registered in the symbol dictionary 150 and an index (i.e., a new index) is assigned to the newly registered symbol. The new index is then provided to the encoding unit 190. The indexes of the representative symbols are data that point to locations at which bitmaps of the corresponding representative symbols are stored in the symbol dictionary 150.

After matching all the symbols in the binary image extracted by the symbol extraction unit 130 with the representative symbols registered in the symbol dictionary 150, the encoding unit 190 generates a symbol dictionary segment by compressing bitmaps of the representative symbols that correspond to the respective indexes in the symbol dictionary 150, bitmaps of the symbols newly registered in the symbol dictionary 150, and shape information of the corresponding representative symbol. The symbol dictionary segment defines bitmaps of the representative symbols that can repeatedly be used in the binary image and includes the corresponding indexes indicating a location of where the bitmaps of the corresponding representative symbols are stored in the symbol dictionary 150 and shape information about the representative symbols. The encoding unit 190 then generates a symbol region segment by compressing indexes assigned in the symbol dictionary 150 and position information of each symbol within the binary image. The symbol region segment includes position information of the matched representative symbols appearing in the binary image and the corresponding indexes of the matched representative symbols to define the bitmap image in terms of the indexes of the matched representative symbols and the position information. According to the present embodiment, the bitmaps of the symbols may be compressed using a memory medium ring encoding or an arithmetic encoding method, and the shape information of each symbol, such as a width and a height of each symbol, may be compressed using a Huffman encoding or an arithmetic encoding method. However, it should be understood that other compression methods can also be used with the present general inventive concept. Also, according to the present embodiment, the position information of each symbol in the binary image and the indexes in the symbol dictionary may be compressed using the Huffman encoding or the arithmetic encoding method, however, it should be understood that other compression methods may also be used by the encoding unit 190. The symbol dictionary segment and the symbol region segment are combined to generate a final bitstream.

Figure 2:
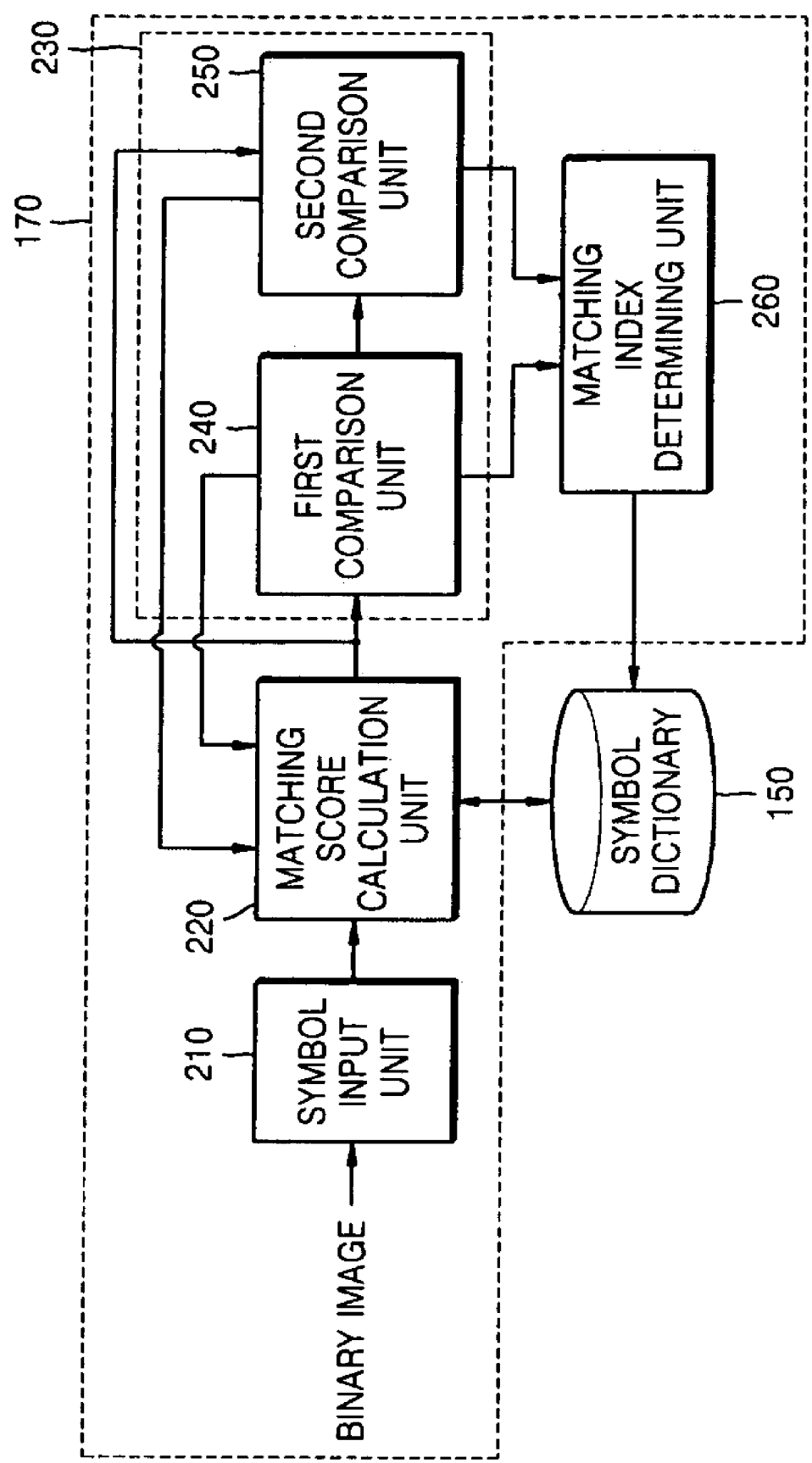
FIG. 2 is a detailed block diagram illustrating a symbol matching unit of the binary compression apparatus of FIG. 1.

FIG. 2 is a detailed block diagram illustrating the symbol matching unit 170. The symbol matching unit 170 includes a symbol input unit 210, a matching score calculation unit 220, a multi-threshold comparison unit 230, and a matching index determination unit 260. The multi-threshold comparison unit 230 includes a first comparison unit 240 and a second comparison unit 250.

Referring to FIG. 2, the symbol input unit 210 receives an extracted symbol provided by the symbol extraction unit 130 (see FIG. 1). In the present embodiment, the symbol may be input in the form of a bitmap.

The matching score calculation unit 220 attempts to sequentially match the input symbol with the representative symbols registered in the symbol dictionary 150 and calculates a matching score, such as a degree of similarity. The matching score can be calculated by performing an exclusive-OR operation on the input symbol and a representative symbol, a weighted exclusive-OR operation on the input symbol and the representative symbol, or by using a computer science and information system (CSIS) program. Here, it should be understood that other pattern matching algorithms can also be used. It can be assumed that the degree of similarity between the input symbol and the representative symbol increases as the matching score decreases. The matching score calculation unit 220 generates matching scores by comparing the input symbol with each of the representative symbols. That is, the plurality of matching scores are obtained from the input symbols and the corresponding ones of the representative symbols. The matching score indicates the degree of similarity and may be low if the input symbol is very similar to the representative symbol, and may be high if the input symbol is quite different from the representative symbol.

The multi-threshold comparison unit 230 compares the matching score of a current input symbol with the first threshold (TH1). If the matching score (or one of the matching scores) is less than the first threshold (TH1), the multi-threshold comparison unit 230 terminates the symbol matching operation of the current input symbol in the matching score calculation unit 220 so that another symbol matching operation for a next input symbol can begin. If the matching score of the current input symbol is greater than the first threshold (TH1), the matching scores calculated between the current input symbol and all representative symbols registered in the symbol dictionary 150 are respectively compared with the second threshold (TH2). The first threshold (TH1) can be used to determine a definite match while the second threshold (TH2) can be used to determine a potential match (or a plurality of potential matches).

More particularly, the first comparison unit 240 of the multi-threshold comparison unit 230 compares the matching score between the current input symbol and an arbitrary representative symbol with the first threshold (TH1). According to a result of the comparison, the first comparison unit 240 determines whether to designate the arbitrary representative symbol as a representative symbol that matches the current input symbol, or whether to compare each of the matching scores between the current input symbol and all the representative symbols with the second threshold (TH2). That is, the index of a first representative symbol which results in a matching score that is less than the first threshold (TH1) from among the representative symbols sequentially compared with the current input symbol in the matching score calculation unit 220 is provided to the matching index determination unit 260. At this time, the symbol matching operation for the current input symbol is complete and the matching score calculation unit 220 performs the symbol matching operation for the next input symbol. If there is no matching score less than the first threshold (TH1) from among all the matching scores sequentially calculated in the matching score calculation unit 220 for all the representative symbols, the matching scores between the current input symbol and all the representative symbols are provided to the second comparison unit 250.

The second comparison unit 250 respectively compares the matching scores between the current input symbol and all representative symbols registered in the symbol dictionary 150 with the second threshold (TH2), and provides the index of a representative symbol that corresponds to a matching score that is less than the second threshold (TH2) to the matching index determination unit 260. Here, the second threshold (TH2) is greater than the first threshold (TH1), and may be, for example, a value twice the value of the first threshold (TH1). Also, there may be a plurality of indexes of the representative symbols that correspond to matching scores that are less than the second threshold (TH2). In this case, the index of a representative symbol that corresponds to a lowest matching score is provided to the matching index determination unit 260. On the other hand, if the comparison result in the second comparison unit 250 indicates that all the matching scores between the current input symbol and all the respective representative symbols are greater than the second threshold (TH2), it is determined that there is no representative symbol in the symbol dictionary 150 that matches the current input symbol. In this case, the current input symbol is assigned a new index and is registered in the symbol dictionary 150 as a new representative symbol.

If there is an index provided by the first comparison unit 240, the matching index determination unit 260 designates the index as a matching index of the current input symbol.

If there is no index provided by the first comparison unit 240, the matching index determination unit 260 designates an index provided by the second comparison unit 250 as the matching index of the current input symbol.

By comparing the matching scores with the first threshold (TH1) and the second threshold (TH2) sequentially, if a matching score that is less than the first threshold (TH1) occurs, the matching score calculation operation for the current input symbol is terminated by the matching score calculation unit 220, and another (or a next) matching score calculation operation for the next input symbol can begin such that an overall speed of the symbol matching operation can be increased, and an accuracy of the symbol matching operation can be improved.

Alternatively, the comparisons with the first threshold (TH1) and (TH2) may have a reverse order. For example, the matching score between the current input symbol and the arbitrary representative symbol calculated in the matching score calculation unit 220 is compared with the second threshold (TH2) in the first comparison unit 240, and if the result of the comparison in the first comparison unit 240 indicates that the matching score is less than the second threshold (TH2), the matching score between the current input symbol and the arbitrary representative symbol can then be compared with the first threshold (TH1).

If either (1) the matching score is greater than the second threshold (TH2) or (2) the matching score is less than the second threshold (TH2) and greater than the first threshold (TH1), the matching score between the current input symbol and a next representative symbol registered in the symbol dictionary 150 is calculated. On the other hand, if the matching score is less than the first threshold (TH1), the matching score calculation operation for the current input symbol is complete, and the index of the corresponding representative symbol is selected as the matching index of the current input symbol. This operation is then performed for each subsequent input symbol (i.e., subsequent extracted input symbols). By performing the process described above, overall speed and accuracy of the symbol matching operation can be improved.

Figure 3:
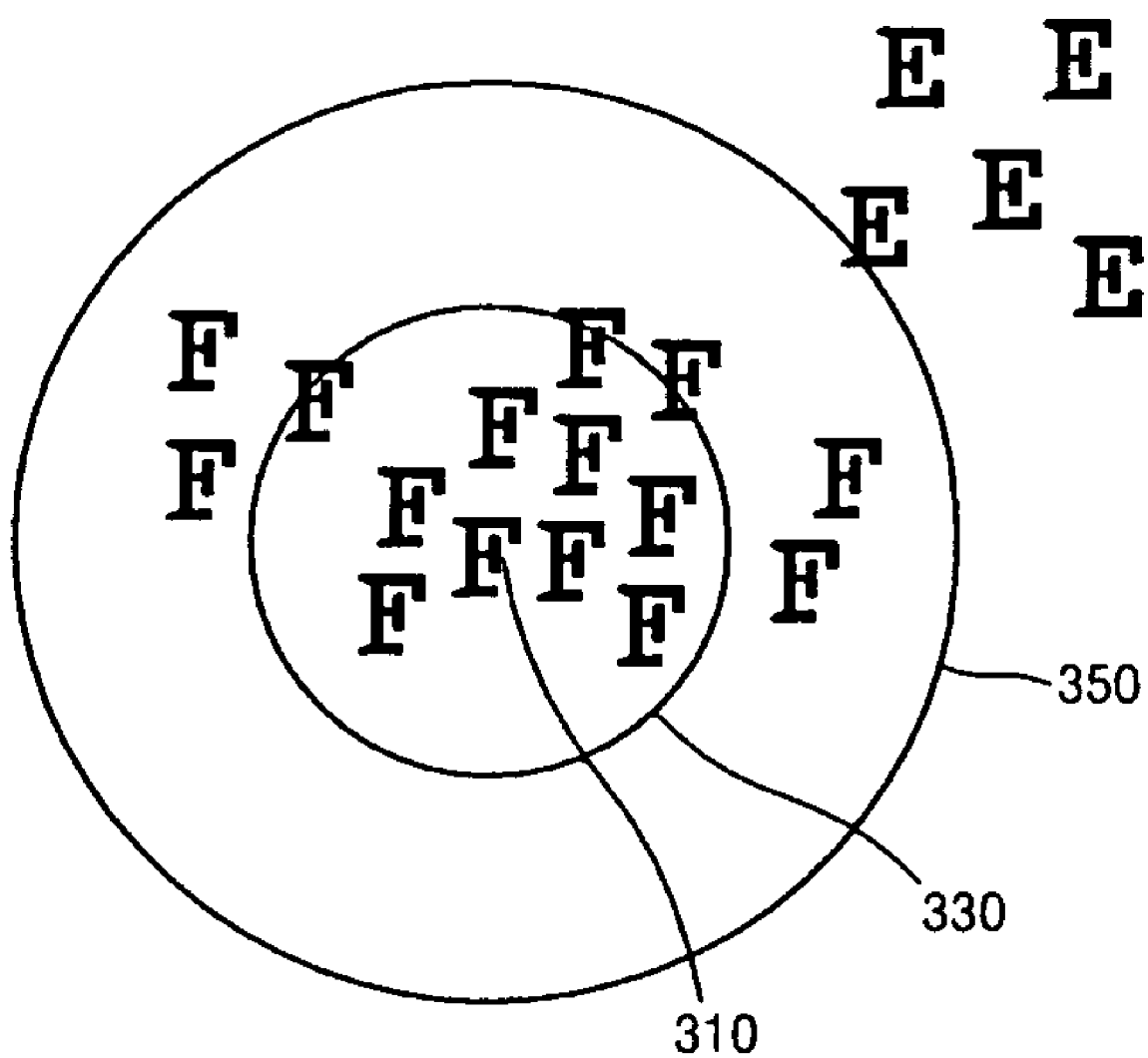
FIG. 3 is a diagram illustrating determination boundaries of a first threshold and a second threshold according to an embodiment of the present general inventive concept.

FIG. 3 is a diagram illustrating a first determination boundary 330 and a second determination boundary 350 according to the first and second thresholds (TH1, TH2) used in the first and second comparison units 240 and 250, respectively. Reference number 310 indicates a position of an arbitrary representative symbol. In the present embodiment, the index of a representative symbol that corresponds to the matching score which first falls inside the first determination boundary 330 is designated as the index of the current input symbol. If no matching score falls inside the first determination boundary 330, the index of a representative symbol that corresponds to a smallest matching score falls between the first determination boundary 330 and the second determination boundary 350 is designated as the index of the current input symbol. If all matching scores fall outside the second determination boundary 350, it is determined that there is no representative symbol in the symbol dictionary 150 that matches the current input symbol. The first and second boundaries 330 and 350 may determine definite and potential matches, respectively.

Figure 4:
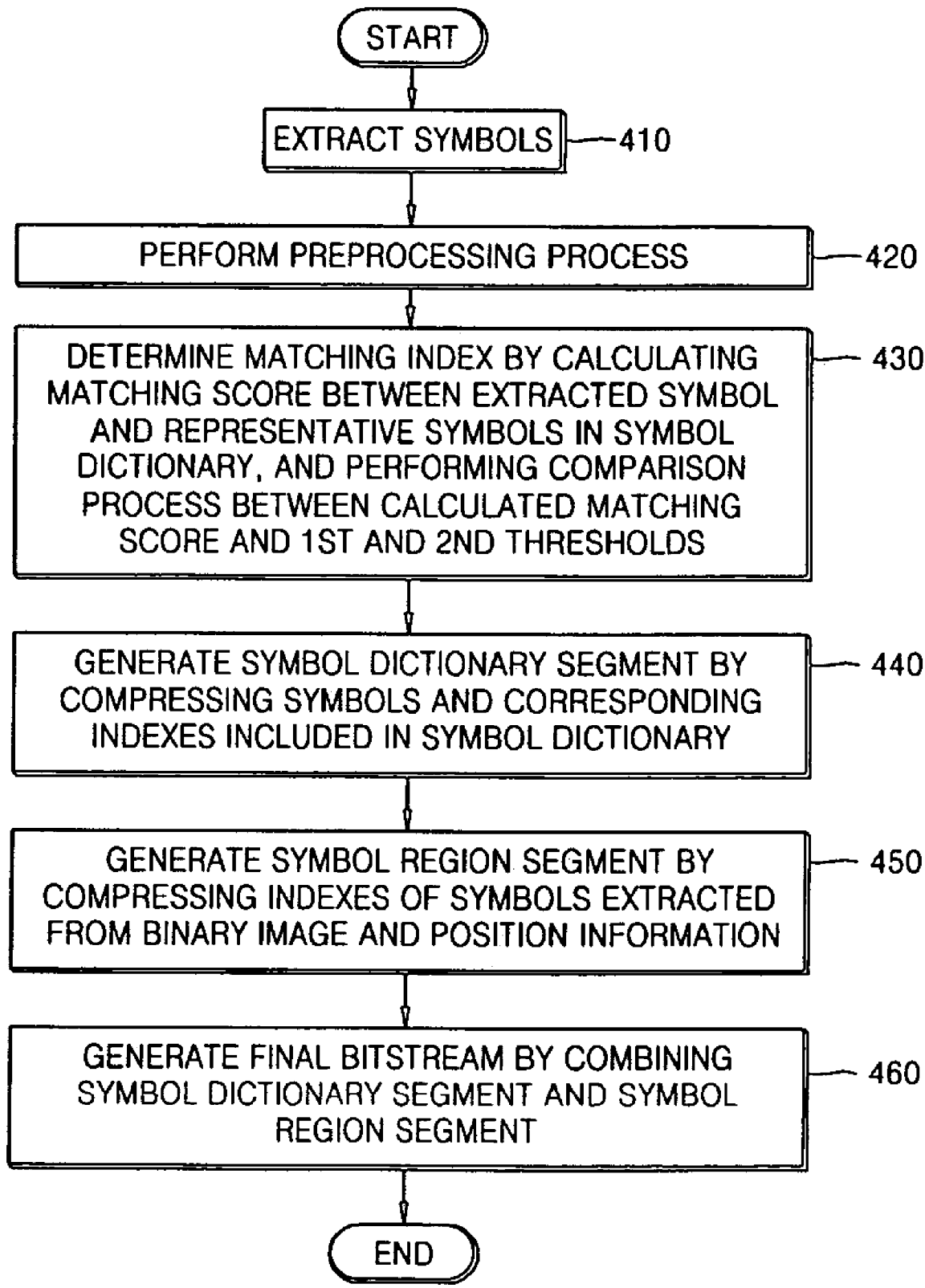
FIG. 4 is a flowchart illustrating a binary image compression method according to an embodiment of the present general inventive concept.

FIG. 4 is a flowchart illustrating a binary image compression method according to an embodiment of the present general inventive concept. The method of FIG. 4 may be performed by the binary image compression apparatus of FIG. 1. Accordingly, for illustration purposes, the method of FIG. 4 is described below with reference to FIGS. 1 to 4.

Referring to FIG. 4, symbols are extracted from a binary image in operation 410. The symbols can be extracted using any of a variety of symbol extraction algorithms, such as a 4-connectivity rule. Other algorithms that achieve the purposes set forth herein may also be used.

In operation 420, a preprocessing process, such as edge smoothing, is performed on the extracted symbols to improve the accuracy of the symbol matching operation. However, it should be understood that although the operation 420 may improve the accuracy of the symbol matching operation, the operation 420 is optional and may not be necessary.

In operation 430, an index for each extracted symbol is determined by comparing the matching scores between the extracted symbol and the representative symbols registered in the symbol dictionary 150 with the first and second thresholds (TH1, TH2). That is, if there is a matching representative symbol in the symbol dictionary 150, the index of the matching representative symbol is designated as the index of the extracted symbol (i.e., the current input symbol) as a representative symbol. If there is no matching representative symbol in the symbol dictionary 150, an index is assigned to the extracted symbol and the extracted symbol is registered in the symbol dictionary 150 as a representative symbol. The assigned index is designated as the index of the extracted symbol.

In operation 440, after the symbol matching operation is performed for all symbols extracted from the binary image in the operation 430, the bitmaps of symbols registered in the symbol dictionary 150 and the corresponding indexes are compressed to generate the symbol dictionary segment. The symbol dictionary 150 includes the representative symbols registered in advance of the symbol matching operation, and the symbols newly added during the symbol matching operation.

In operation 450, after the symbol matching operation is performed for all symbols extracted from the binary image in the operation 430, the indexes that correspond to the symbols extracted from the binary image and the position information of the respective extracted symbols are compressed to generate the symbol region segment.

In operation 460, a final bitstream is generated by combining the symbol dictionary segment and the symbol region segment.

Figure 5:
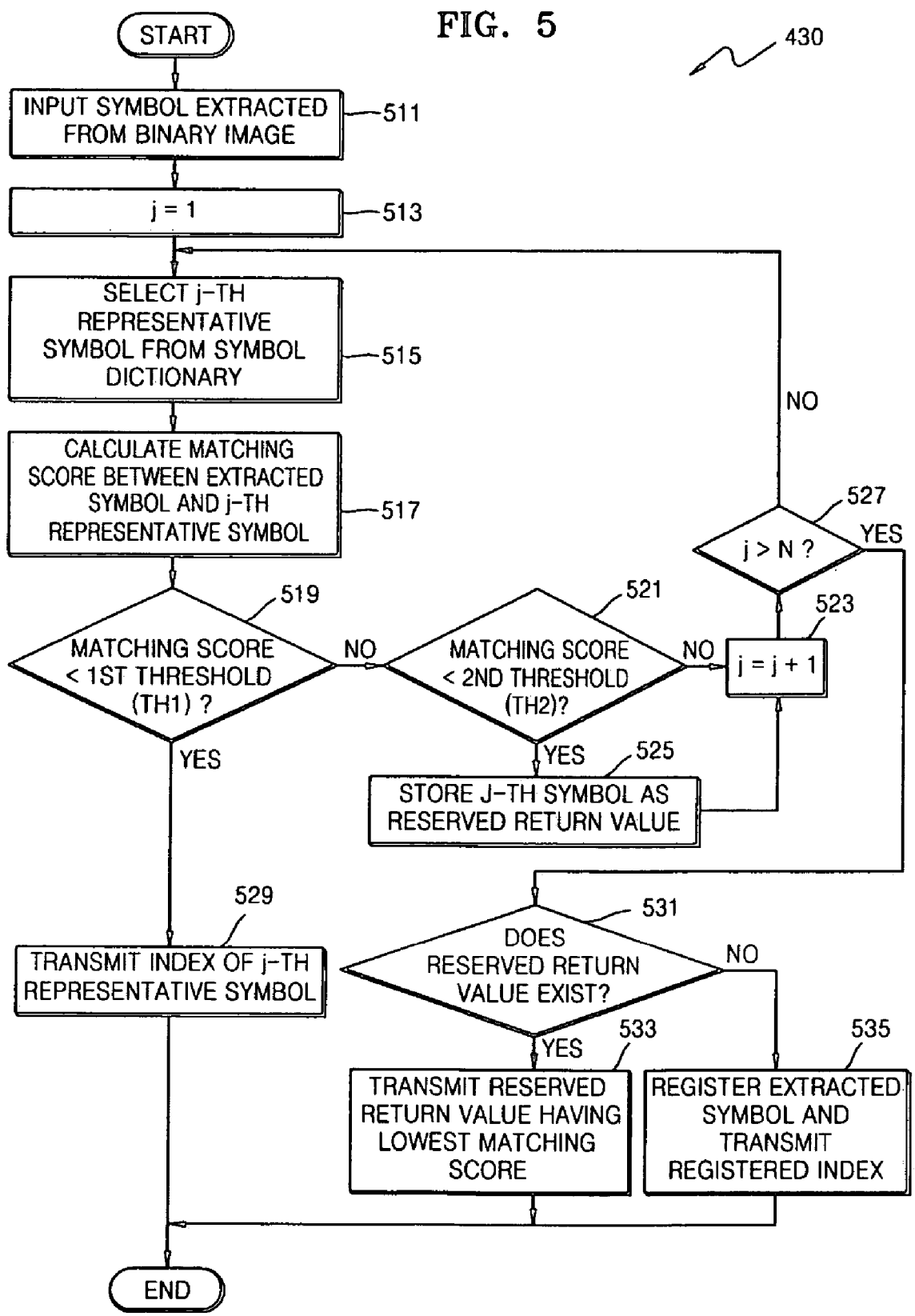
FIG. 5 is a detailed flowchart of an operation 430 of the binary image compression method of FIG. 4, according to an embodiment of the present general inventive concept.

FIG. 5 is a flowchart illustrating the operation 430 of the method of FIG. 4 in greater detail, according to an embodiment of the present general inventive concept.

Referring to FIG. 5, the symbols extracted from the binary image are input in operation 511. In operation 513, an index "j" in the symbol dictionary 150 is set to 1 (i.e., initialized).

In the operation 515, a representative symbol that corresponds to a j-th index in the symbol dictionary 150 is selected.

In operation 517, the matching score between the current input symbol in the operation 511 and the representative symbol that corresponds to the j-th index selected in the operation 515 is calculated.

In operation 519, the matching score calculated in the operation 517 is compared with the first threshold (TH1). If the result of the comparison in the operation 519 indicates that the matching score is greater than or equal to the first threshold (TH1), the matching score calculated in the operation 517 is compared with the second threshold (TH2) in operation 521. If the result of the comparison in the operation 521 indicates that the matching score is greater than or equal to the second threshold (TH2), the index "j" is increased by 1 in operation 523. On the other hand, if the result of the comparison in the operation 521 indicates that the matching score is less than the second threshold (TH2), the index of the representative symbol that corresponds to the j-th index is stored as a reserved return value in operation 525 (indicating a potential match), and then the operation 523 is performed. More than one index can be stored as more than one reserved return value. The reserved return values are indexes that correspond to representative symbols that have a matching score with respect to the extracted symbol that are less than the second threshold (TH2), and are therefore saved for further comparisons between the extracted symbol and other representative symbols. As described below, if no representative symbol having a matching score that is less than the first threshold (TH1) is found, the lowest matching score from among the indexes of the reserved return values is selected. In operation 527, it is determined whether the index "j" in the symbol dictionary 150, which has been increased in the operation 523, is greater than a maximum index N of the symbol dictionary 150. If the index "j" is less than or equal to the maximum index N, the operation 515 is performed again.

Referring back to the operation 519, the result of the comparison in the operation 519 indicates that the matching score is less than the first threshold (TH1), the index of the representative symbol that corresponds to the j-th index is transmitted (i.e., output) in operation 529 (indicating a definite match). If the result of the comparison in the operation 527 indicates that the index "j" in the symbol dictionary 150, which has been increased in the operation 523, is greater than the maximum index N of the symbol dictionary 150, it is determined whether a reserved return value exists in operation 531. If the result of the determination in the operation 531 indicates that a reserved return value exists, a reserved return value that corresponds to the smallest matching score is transmitted as the index of the representative symbol that matches the extracted symbol (i.e., of the matching representative symbol) in operation 533. If the result of the determination in the operation 531 indicates that a reserved return value does not exist, the current input symbol is registered in the symbol dictionary 150 together with an index, and the registered index is transmitted in operation 535.

Figure 6:
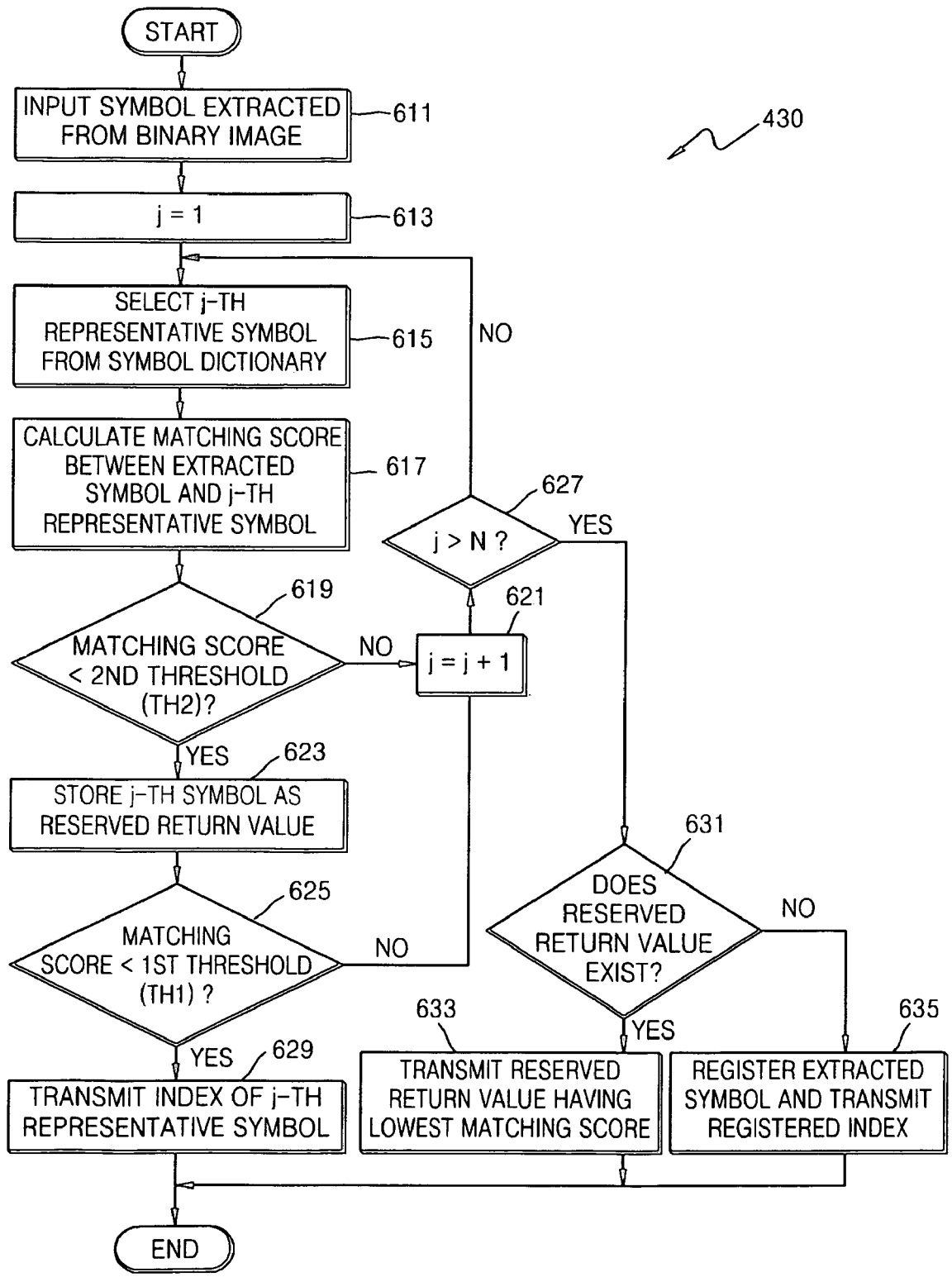
FIG. 6 is a detailed flowchart of an operation 430 of the binary image compression method of FIG. 4, according to another embodiment of the present general inventive concept.

FIG. 6 is a flowchart illustrating the operation 430 of the method of FIG. 4 in greater detail, according to another embodiment of the present general inventive concept.

Referring to FIG. 6, the symbols extracted from the binary image are input in operation 611. In operation 613, an index "j" in the symbol dictionary 150 is set to 1 (i.e., is initialized).

In operation 615, a representative symbol that corresponds to the j-th index in the symbol dictionary 150 is selected.

In operation 617, the matching score between the current input symbol in operation 611 and the representative symbol that corresponds to the j-th index selected in the operation 615 is calculated.

In operation 619, the matching score calculated in the operation 617 is compared with the second threshold (TH2).

If the result of the comparison in the operation 619 indicates that the matching score is greater than or equal to the second threshold (TH2), the index "j" in the symbol dictionary 150 is increased by 1 in operation 621. On the other hand, if the result of the comparison in the operation 619 indicates that the matching score is less than the second threshold (TH2), the index of the representative symbol that corresponds to the j-th index is stored as a reserved return value in operation 623, and operation 625 is performed.

More than one index can be stored as more than one reserved return value. In the operation 625, the matching score calculated in the operation 617 is compared with the first threshold (TH1), and if the matching score is greater than or equal to the first threshold (TH1), the operation 621 is performed. In operation 627, it is determined whether the index "j" in the symbol dictionary 150, which has been increased in the operation 621, is greater than the maximum index N of the symbol dictionary 150. If the index "j" is less than or equal to the maximum index (N), the operation 615 is performed again.

Referring back to the operation 625, if the result of the comparison in the operation 625 indicates that the matching score is less than the first threshold (TH1), the index of the representative symbol that corresponds to the j-th index is transmitted (i.e., is output) in operation 629. If the result of the comparison in the operation 627 indicates that the index "j" in the symbol dictionary 150, which has been increased in the operation 621, is greater than the maximum index N of the symbol dictionary 150, it is determined whether a reserved return value exists in operation 631. If the result of the determination in the operation 631 indicates that the reserved return value exists, a reserved return value that corresponds to a smallest matching score is transmitted as the index of the representative symbol that matches the extracted symbol (i.e., of the matching representative symbol) in operation 633. If the result of the determination in the operation 631 indicates that the reserved return value does not exist, the current input symbol is registered in the symbol dictionary 150 together with an index, and the registered index is transmitted in operation 635.

Figure 7:
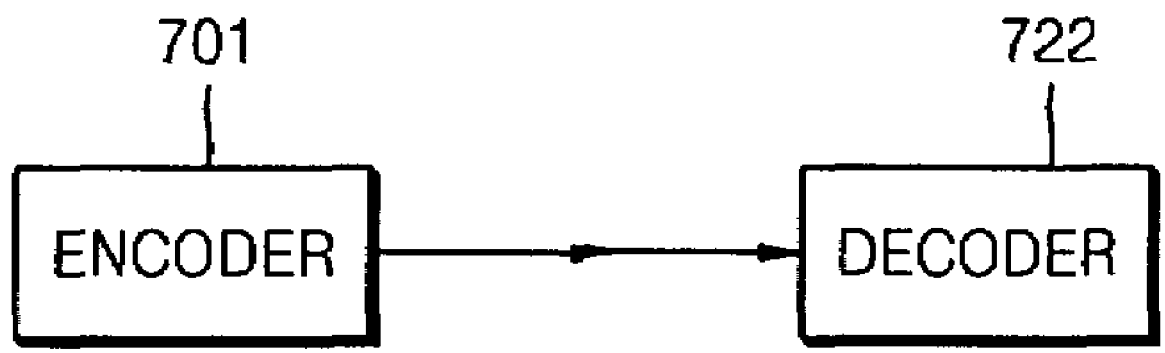
FIG. 7 illustrates a communication system having an encoder 701 and a decoder 722, according to an embodiment of the present general inventive concept.

FIG. 7 illustrates a communication system including an encoder 701 and a decoder 722, according to an embodiment of the present general inventive concept. The encoder 701 may include the binary compression apparatus of FIG. 1. The encoder 701 encodes a bitstream having information about a binary image and transmits the bitstream to the decoder 722. The decoder then decodes the bitstream received from the encoder 701.

The present general inventive concept can also be embodied as computer readable code on a computer readable recording medium. The computer readable recording medium may be any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, code, and code segments for accomplishing the present general inventive concept can be easily construed by programmers skilled in the art to which the present general inventive concept pertains.

According to the embodiments of the present general inventive concept as described above, pattern matching by using multiple thresholds is performed on a binary image and a result of the pattern matching is compressed such that an overall speed of the matching operation can be increased, and accuracy of the matching operation can be enhanced.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An apparatus to compress a binary image, the apparatus comprising:
    a symbol extraction unit to extract symbols from a binary image;
    a symbol dictionary including a plurality of representative symbols registered therein and to register one or more of the extracted symbols when the one or more extracted symbols do not match any of the registered representative symbols;
    a symbol matching unit to perform a matching operation of the extracted symbols with the representative symbols using a plurality of thresholds to determine an index of the extracted symbols; and
    an encoding unit to compress symbols registered in the symbol dictionary and corresponding indexes, to compress indexes of the extracted symbols from the binary image and position information of each of the extracted symbols in the binary image, and to generate a final bitstream from the compressed symbols, indexes, and position information.

2. The apparatus of claim 1, further comprising:
    a preprocessing unit to smooth edges of the extracted symbols.

3. The apparatus of claim 1, wherein the symbol matching unit comprises:
    a matching score calculation unit to calculate a first matching score by performing the matching operation of a current symbol input from the symbol extraction unit with one of the representative symbols;
    a multi-threshold comparison unit to compare the first matching score with a first threshold, and if the first matching score is greater than the first threshold, to compare each of a plurality of second matching scores obtained by performing the matching operation of the current symbol with all the representative symbols, with a second threshold; and
    a matching index determination unit to determine a matching index of the current symbol according to a result of one or more comparisons of the multi-threshold comparison unit.

4. The apparatus of claim 3, wherein the multi-threshold comparison unit comprises:
    a first comparison unit to compare the first matching score with the first threshold and, if the first matching score is less than the first threshold, terminating operation of the matching score calculation unit for the current symbol; and
    a second comparison unit to respectively compare each of the first and second matching scores obtained by the matching operation of the current symbol with all the representative symbols with the second threshold, if the first and second matching scores are greater than the first threshold.

5. The apparatus of claim 3, wherein the multi-threshold comparison unit comprises:
    a first comparison unit to compare the first matching score with the second threshold, and if the first matching score is greater than the second threshold, to compare each of the second matching scores between subsequent representative symbols registered in the symbol dictionary and the current symbol with the second threshold; and a second comparison unit to compare the first matching score with the first threshold if the first matching score is less than the second threshold, to terminate the operation of the matching score calculation unit for the current symbol if the first matching score is less than the first threshold, and to compare each of the first and second matching scores between subsequent representative symbols registered in the symbol dictionary and the current symbol with the first threshold, if the first matching score is greater than the first threshold.

6. The apparatus of claim 3, wherein the matching index determination unit designates either an index of the representative symbol that corresponds to the matching score that is less than the first threshold as a matching index of the current symbol, an index of the representative symbol that corresponds to a smallest matching score among the first and second matching scores that are greater than the first threshold and less than the second threshold as the matching index of the current symbol, or an index assigned to the current symbol being registered in the symbol dictionary as the matching index of the current symbol.

7. The apparatus of claim 3, wherein the second threshold is greater than the first threshold.

8. The apparatus of claim 7, wherein the second threshold is twice the first threshold.

9. An apparatus to compress a binary image, the apparatus comprising:
a symbol extraction unit to extract first and second symbols from a binary image;
a memory unit to store representative symbols; and
a unit to determine one of the representative symbols as a first representative symbol corresponding to the first symbol according to a first threshold and a first comparison result between the first symbol and the representative symbols, to determine another one of the representative symbols as a second representative symbol corresponding to the second symbol according to the first threshold, a second threshold, and a second comparison result between the second symbol and the representative symbols, and to generate a bitstream according to information on the first representative symbol, the first symbol, the second representative symbol, and the second symbol.

10. The apparatus of claim 9, wherein the unit does not use the second threshold to determine the first representative symbol.

11. The apparatus of claim 9, wherein the unit sequentially calculates matching scores between the first symbol and the representative symbols, compares each of the calculated matching scores with the first threshold, and the unit does not calculate any more matching scores for the first symbol once the unit determines that one of the matching scores is less than the first threshold.

12. An apparatus to compress a binary image, the apparatus comprising:
an encoder, including
a symbol extraction unit to extract first and second symbols from a binary image,
a memory unit to store representative symbols, and
a unit to determine one of the representative symbols as a first representative symbol corresponding to the first symbol according to a first threshold and a first comparison result between the first symbol and the representative symbols, to determine another one of the representative symbols as a second representative symbol corresponding to the second symbol according to the first threshold, a second threshold, a second comparison result between the second symbol and the representative symbols, and to generate a bitstream according to information on the first representative symbol, the first symbol, the second representative symbol, and the second symbol; and
a decoder to receive the bitstream and to decompress the bitstream into binary image data.

13. A binary image compression apparatus, comprising:
an extraction unit to extract one or more symbols from a binary image; and
a symbol matching unit to select one or more preregistered symbols that match the one or more extracted symbols by comparing the one or more extracted symbols to one or more preregistered symbols to determine one or more similarity scores, comparing the one or more similarity scores to at least one of a definite threshold that indicates a definite match and a potential threshold that indicates a potential match, and selecting the one or more preregistered symbols based on the comparison with the at least one of the definite and potential thresholds.

14. The apparatus of claim 13, wherein the symbol matching unit selects a first preregistered symbol having a similarity score with a current extracted symbol that exceeds the definite threshold.

15. The apparatus of claim 13, wherein if the symbol matching unit determines that none of the preregistered symbols have a similarity score with a current extracted symbol that exceeds the definite threshold, the symbol matching unit selects a preregistered symbol having a greatest similarity with the current extracted symbol from among one or more preregistered symbols having similarity scores with the current extracted symbol that exceed the potential threshold.

16. The apparatus of claim 13, wherein the symbol matching unit determines a first similarity score between a first preregistered symbol and a first extracted symbol, and if the first similarity score exceeds the definite threshold, the first preregistered symbol is selected as a matching preregistered symbol, and otherwise the symbol matching unit determines at least one second similarity score between at least one second preregistered symbol and the first extracted symbol such that the first similarity score and the at least one second similarity score are compared to the potential threshold and the matching preregistered symbol is selected according thereto.

17. The apparatus of claim 13, further comprising:
an index determination unit to select one or more indexes of the one or more matching preregistered symbols; and
an encoding unit to receive the selected one or more indexes of the one or more matching preregistered symbols and to encode information about the one or more extracted symbols according to the indexes of the matching preregistered symbols and the preregistered symbols.

18. The apparatus of claim 13, wherein if the symbol matching unit obtains the definite match for a current extracted symbol, the symbol matching unit searches for a preregistered symbol that matches a next extracted symbol.

19. The apparatus of claim 13, wherein if the symbol matching unit obtains the potential match for a current extracted symbol, the symbol matching unit continues to search for a preregistered symbol that is the definite match for the current extracted symbol.

20. The apparatus of claim 13, wherein the symbol matching unit comprises:

a definite match comparison unit to compare the one or more similarity scores to the definite threshold to determine whether one of the preregistered symbols is a definite match for a current extracted symbol; and a potential match comparison unit to compare the one or more similarity scores to the potential threshold to determine whether any preregistered symbols are potential matches of the current extracted symbol and to select from among the potential matches when no definite match is determined by the definite match comparison unit.

21. A symbol matching apparatus, comprising:

a symbol matching unit to match one or more symbols extracted from a binary image by comparing one or more similarity scores between the one or more extracted symbols and one or more preregistered representative symbols to each of at least two similarity score thresholds to determine a matching representative symbol; and a matching index determining unit to determine an index of the one or more preregistered symbols as a matching index of the one or more extracted symbols when the one or more similarity scores is less than a one of the at least two similarity score thresholds.

22. A symbol matching unit to match one or more symbols extracted from a binary image, comprising:

a matching score calculation unit to calculate a first similarity score between a current extracted symbol and a first preregistered symbol;

a first comparison unit to compare the first similarity score with a first threshold; and a matching index determining unit to determine an index of the first preregistered symbol as a matching index of the current extracted symbol, when the first similarity score is less than the first threshold.

23. The unit of claim 22, wherein the matching score calculation unit further calculates one or more second similarity scores between the current extracted symbol and one or more second preregistered symbols, when the first similarity score is greater than or equal to the first threshold.

24. A binary compression apparatus comprising:

a symbol extraction unit to extract a plurality of symbols from a binary image;

a score calculation unit to determine a similarity score between a first extracted symbol and a first representative symbol; and a multithreshold comparison unit to determine whether the similarity score has a high degree of similarity, a low degree of similarity, or a medium degree of similarity according to a comparison with a plurality of similarity thresholds and to determine whether the first representative symbol matches the first extracted symbol based on the comparison of the corresponding similarity score with the plurality of similarity thresholds.

25. A binary compression apparatus, comprising:

a symbol extraction unit to extract symbols from a binary image; and a symbol matching unit to match each extracted symbol with one of a plurality of registered symbols using a high similarity threshold and a low similarity threshold, wherein the symbol matching unit matches a first extracted symbol with a first registered symbol when a degree of similarity therebetween is greater than the high similarity threshold, and determines that the first extracted symbol does not match the first registered symbol when the degree of similarity is less than the low similarity threshold.

26. The apparatus of claim 25, wherein the symbol matching unit compares the first extracted symbol with the plurality of registered symbols when the degree of similarity falls between the high and low similarity thresholds.

27. A binary compression apparatus, comprising:

a symbol extraction unit to extract at least one symbol from a binary image; and a symbol matching unit to sequentially compare the at least one extracted symbol with a plurality of registered symbols until a registered symbol of a first predetermined degree of similarity is selected while maintaining registered symbols having a second predetermined degree of similarity with the at least one extracted symbol such that if none of the registered symbols have the first predetermined degree of similarity with the at least one extracted symbol, one of the maintained registered symbols is selected.

28. The apparatus of claim 27, wherein the selected maintained registered symbol corresponds to the maintained registered symbol having the highest degree of similarity with the at least one extracted symbol from among the maintained registered symbols.

29. The apparatus of claim 27, wherein an index of the selected registered symbol is determined as a matching index of the at least one extracted symbol, and the apparatus further comprises:

an encoding unit to receive the matching index and to compress the selected registered symbol and the matching index as a segment.

30. A binary image compression method comprising:

extracting symbols from a binary image;

comparing each matching score between the extracted symbols and representative symbols registered in a symbol dictionary with a plurality of thresholds to designate an index for the extracted symbols; and compressing symbols registered in the symbol dictionary and corresponding indexes and compressing indexes of the extracted symbols from the binary image and position information of each of the extracted symbols in the binary image, and generating a final bitstream from the compressed symbols, indexes, and position information.

31. The method of claim 30, further comprising:

smoothing edges of the extracted symbols.

32. The method of claim 30, wherein the designating of the indexes for the extracted symbols comprises:

determining whether one of the representative symbols that matches a current symbol exists in the symbol dictionary;

if a representative symbol that matches the current symbol exists in the symbol dictionary, determining an index of the matching representative symbol as the index of the current symbol; and if a representative symbol that matches the current symbol does not exist in the symbol dictionary, designating a new index for the current symbol, registering the current symbol in the symbol dictionary, and designating the new index as the index of the current symbol.

33. The method of claim 32, wherein the determining of whether a representative symbol that matches the current symbol exists in the symbol dictionary comprises:

determining a first representative symbol that corresponds to a first matching score that is less than the first threshold as the representative symbol that matches the current symbol; and if a representative symbol having a matching score that is less than the first threshold does not exist, designating a representative symbol that corresponds to a smallest matching score that is greater than the first threshold and less than the second threshold as the representative symbol that matches the current symbol.

34. The method of claim 33, wherein the second threshold is greater than the first threshold.

35. The method of claim 34, wherein the second threshold is twice the first threshold.

36. The method of claim 32, wherein the determining of whether a representative symbol that matches the current symbol exists in the symbol dictionary comprises:

comparing the respective matching scores between the current symbol and arbitrary representative symbols of the symbol dictionary with the first threshold;

if one of the matching scores is less than the first threshold, designating an index of the representative symbol that corresponds to the matching score that is less than the first threshold as the index of the current symbol; and if all the matching scores are greater than the first threshold, comparing all the matching scores with the second threshold, and designating an index of the representative symbol that corresponds to a smallest matching score less than the second threshold as the index of the current symbol.

37. The method of claim 32, wherein the determining of whether a representative symbol that matches the current symbol exists in the symbol dictionary comprises:

comparing the matching score between the current symbol and an arbitrary representative symbol of the symbol dictionary with the second threshold, and if the matching score is less than the second threshold, comparing the matching score with the first threshold;

if the matching score that is less than the second threshold is also less than the first threshold, designating an index of the arbitrary representative symbol that corresponds to the matching score that is less than the first threshold as the index of the current symbol; and designating an index of a representative symbol that corresponds to a smallest matching score among one or more matching scores that are greater than the first threshold and less than the second threshold as the index of the current symbol.

38. A method of compressing a binary image, the method comprising:

extracting at least one symbol from a binary image; and sequentially comparing the at least one extracted symbol with a plurality of registered symbols until a registered symbol of a first predetermined degree of similarity is selected while maintaining registered symbols having a second predetermined degree of similarity with the at least one extracted symbol such that if none of the registered symbols have the first predetermined degree of similarity one of the maintained registered symbols is selected.

39. A computer readable recording medium having embodied thereon a computer program to execute a binary image compression method, the medium comprising:

an executable code to extract symbols from a binary image;

an executable code to compare each matching score between the extracted symbols and representative symbols registered in a symbol dictionary with a plurality of thresholds to designate an index for the extracted symbols; and an executable code to compress symbols registered in the symbol dictionary and corresponding indexes and compressing indexes of the extracted symbols from the binary image and position information of each of the extracted symbols in the binary image, and generating a final bitstream from the compressed symbols, indexes, and position information.

40. The computer readable recording medium of claim 39, wherein the second threshold is greater than the first threshold.

41. The computer readable recording medium of claim 40, wherein the second threshold is twice the first threshold.

* * * * *